July 19, 1960   E. PRIBRAM   2,945,641
AIRCRAFT WITH WING CONTAINING LIFTING JETS
Filed Sept. 17, 1957   2 Sheets-Sheet 1
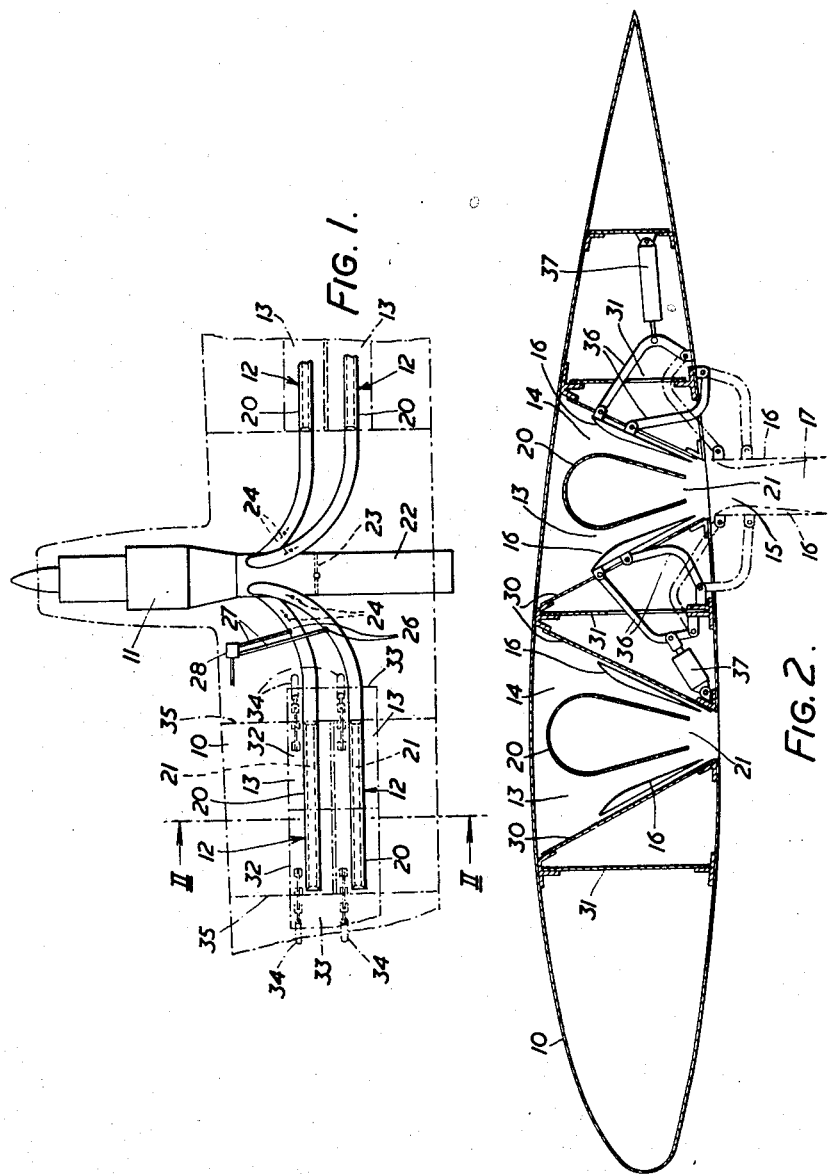
INVENTOR
EDWIN PRIBRAM
BY
ATTORNEY

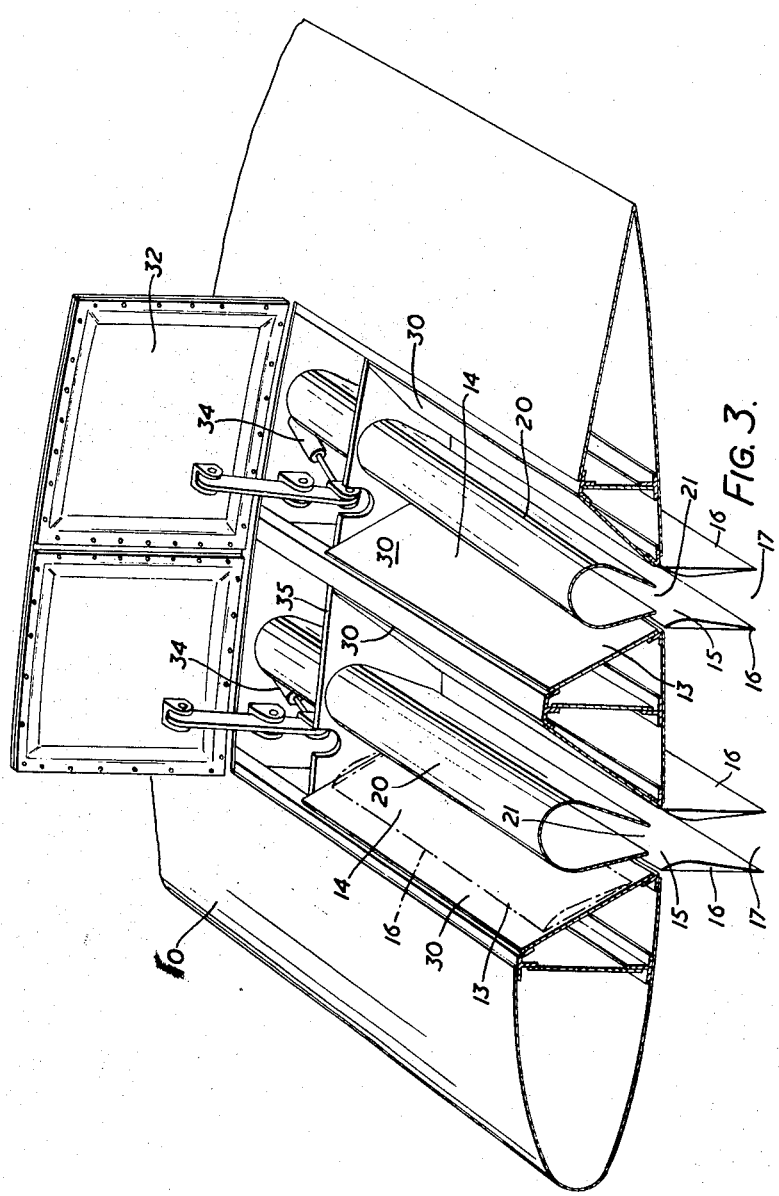

United States Patent Office 2,945,641
Patented July 19, 1960

2,945,641

AIRCRAFT WITH WING CONTAINING LIFTING JETS

Edwin Pribram, Hayes, England, assignor, by mesne assignments, to Fairey Aviation Limited, Hayes, England, a company of Great Britain Filed Sept. 17, 1957, Ser. No. 684,465

Claims priority, application Great Britain Sept. 20, 1956

3 Claims. (Cl. 244—12)

This invention relates to thrust generators, and to aircraft incorporating such thrust generators, and is particularly although not exclusively concerned with providing an aircraft with vertical thrust generator means capable of effecting or assisting vertical take-off.

According to one aspect of the present invention, a thrust generator comprises a duct which converges from an open mouth to a throat leading to a discharge nozzle, a member connected to a source of fluid having an orifice positioned and arranged to project a high-velocity jet of the fluid through at least a part of the duct in the mouth-to-throat direction to induce an airstream to flow into the mouth and through the duct and out through its discharge nozzle, and means for injecting and burning fuel in the airstream.

The source of fluid conveniently comprises a source of hot combustion gases and/or burning fuel. For example the source may be derived from the exhaust of a gas turbine or other gas generator. In many cases no separate ignition means will be necessary, the fuel being raised to its flash point and ignited spontaneously by the hot combustion gases. However in certain cases separate ignition means may be provided for igniting the fuel in the air stream.

The thrust generator thus operates by exploiting the energy of the high-velocity jet of fluid to increase the main flow of gas and air through the duct, and to accelerate this increased main flow by burning fuel in it at approximately constant pressure so as to expand it, thereby producing an increased rate of change of momentum resulting in a reaction thrust greater than that due to the high-velocity jet of fluid alone.

The arrangement of the invention differs from a conventional after-burner in that, due to the increased main flow, the thrust efficiency is largely increased. Moreover the arrangement is not subject to the same temperature limitation as after-burning in a conventional jet nozzle, which limits the thrust augmentation to 50%. The jet speed heat and noise of a thrust generator according to the present invention may be arranged to be low, which is of particular importance at or near ground level.

In one arrangement of the invention a pipe connected to the source of fluid leads to a nozzle positioned within the duct of the thrust generator, and fuel injection means is provided for injecting fuel into the interior of the pipe upstream of the nozzle.

Thus according to another aspect of the present invention, a gas turbine is combined with several of the thrust generators by dividing the exhaust gases from the gas turbine into a corresponding number of separate streams each of which is supplied to one of the thrust generators as its source of fluid under pressure.

For example, where the gas turbine comprises a jet-propulsion engine, the jet pipe may be connected to branch pipes leading to the various thrust generators, and means may be provided for diverting the efflux gases from the jet pipe into the branch pipes, and for burning additional fuel in the airstreams induced to flow through the ducts.

The invention according to another of its aspects resides in an aircraft povided with at least one of the thrust generators referred to, arranged to apply an upward thrust to the aircraft so as to assist its take-off or landing. Each thrust generator may be mounted in the aircraft in a position in which its discharge nozzle is directed vertically or nearly vertically downwards when the aircraft is standing on the ground.

Thus in one arrangement an aircraft is provided with a jet propulsion engine arranged to afford a generally horizontal thrust for normal forward flight, and with several of the thrust generators arranged with their nozzles directed downwardly so as to afford an upward thrust transverse to the axis of the jet-propulsion engine for vertical take-off or landing.

Means may be provided for diverting at will a part or the whole of the efflux gases of the jet-propulsion engine from its jet pipe into branch pipes connected to the several thrust generators.

The invention may be carried into practice in various ways, but one specific embodiment will now be described by way of example with reference to the accompanying drawings, in which:

Figure 1 is a plan of part of a wing of a jet-engined aircraft equipped with thrust generators in accordance with the invention, Figure 2 is a section on the line II—II of Figure 1, and Figure 3 is a perspective view from above of a cut-away portion of the wing of Figures 1 and 2 with the upper doors open.

In the embodiment illustrated, a jet-engined aircraft is equipped with thrust generators in each wing for effecting vertical take-off. A portion only of one of the wings is shown at 10 in the figures, the aircraft being equipped with jet-propulsion engines one of which is shown at 11 in Figure 1.

Thrust generators 12 are mounted in the aircraft port and starboard wing sections symmetrically about the fore-and-aft axis of the aircraft, each thrust generator including an elongated duct 13 extending longitudinally parallel to the wing span and formed in the actual thickness of the wing, each duct 13 having a wide inlet mouth 14 at the top surface of the wing and converging in cross-section to a throat 15 situated approximately at the bottom surface of the wing. Each duct 13 is extended downwardly by means of a pair of retractable flaps 16 which when projected downwardly below the wing form a slightly divergent nozzle 17 opening downwardly from the throat 15. The general cross-sectional shape of each duct 13 is such that an accelerating air flow can be induced with minimum losses in the downward direction through the wing thickness from inlet mouth to nozzle of the duct transversely to its length.

Extending along each of the ducts 13 parallel to its length and to the wing span is a distribution pipe 20 formed with a downwardly directed elongated nozzle 21 along its lower face within the limits of the length of the duct 13. The pipes 20 are connected at their ends remote from the nozzles 21 to the jet pipes of the engines of the aircraft. Thus as shown in Figure 1 the engine 11 is associated with four distribution pipes 20 leading into four ducts 13 arranged two on either side of the engine 11 in parallel, side-by-side disposition. The four pipes 20 are swept forwardly and lead into the jet pipe 22 of the engine near its root at a small acute angle to its axis. The jet pipe 22 is provided with a main valve 23 downstream of the junction with the distribution pipes 20. The valve 23, which is shown diagrammatically as a butterfly valve, may be of any suitable type capable of shutting off the main bore of the jet pipe 22 so that the hot gases will be diverted into the four distribution pipes 20 when butterfly valves 24 respectively incorporated in the pipes 20 are open. The hot compressed combustion gas produced by the engine can thus be directed either straight through the jet pipes of the engines 11 in the conventional way, or through the distribution pipes 20 and nozzles 21 into the ducts 13 and thence downwardly through their discharge nozzles 17, by suitable operation of the valves 23 and 24.

Each of the distribution pipes 20 is also provided with a fuel injector 26 situated just downstream of the associated valve 24 and connected by means of a fuel line 27 through a fuel control valve 28 to the aircraft fueul tank, by means of which fuel can be injected into the flow of hot gases in the pipe 20 and burnt in the duct 13 below the nozzle 21. Flame holders may be incorporated in the duct 13 below the nozzle 21 if desired, for example mounted on the sides of the retractable flaps 16.

When a high speed jet of sot combustion gases is projected into each duct 13 from the associated nozzle 21, it imparts momentum to the air in the duct adjoining it and causes a downward flow of air through the duct, fresh air being drawn in at the duct mouth 14 at the top of the wing. Some distance below the nozzle 21 the velocities of flow of the jet of fuel-bearing gases and of the indrawn air stream will approach equality and a combustible mixture will be formed which, suitably ignited, will continue to burn and increase the temperature of the air stream flowing downwardly through the duct. The downward velocity of the airstream will consequently increase and an upward reaction thrust will be exerted on the aircraft due to the change of momentum of the air stream.

The ducts 13 themselves are formed by inclined walls 30 let into open sections of the wing 10 between the main spars 31. Each pair of ducts 13 can be covered by a pair of doors 32 hinged about axes 33 along their outer edges parallel to the fore-and-aft axis of the aircraft. The doors 32 thus lie over the ducts 13 flush with the upper surface of the wing for normal horizontal flight, but can be swung upwardly about their hinges by means of hydraulic jacks 34 to expose the mouths of the ducts when the thrust generators are required to come into use. It will be noted that the doors 32 when opened remain in planes parallel to the general direction of forward flight of the aircraft, so that when open they are not subjected to excessive forces by the air flow hen the aircraft is in forward flight. Only one of the doors 32 associated with the two ducts 13 is shown in Figure 3, the second door having been omitted for the sake of clarity.

The distribution pipes 20 are supported in the ducts 13 by means of bulkheads 35, and are of generally horseshoe shaped section in the ducts as shown, to afford the nozzles 21. The distribution pipes 20, like the ducts 13, are wholly buried in the thickness of the wing.

The flaps 16 which form the divergent discharge nozzle 17 of each duct are however movable from a retracted position as shown in continuous lines in Figure 2 in which they are wholly buried in the wing section, into a downwardly protruding position as shown in chain lines in the right-hand part of Figure 2, and in Figure 3, in which they form the discharge nozzle 17 of the duct which projects below the wing. Each flap 16 is carried by a pair of bent links 36 each pivoted at one end to the flap and at the other end to an anchorage on the wing spar, the links 36 extending through slots in the adjacent main spar 31 and inclined duct wall 30. An electric, hydraulic or pneumatic motor 37 is provided for each of the flaps 16 and acts on one of the links 36 associated with that flap to move it from its retracted into its extended position or vice versa by pivotal movement on the links 36, the flap passing through the elongated space between the bottom each of the adjacent duct wall 30 and nozzle 21. In Figure 3 the motors 37 and links 36 have been omitted altogether for the sake of clarity, and in Figure 2 only the motors and links associated with the flaps of the rearmost thrust generator are shown, but it will be understood that the two flaps of each thrust generator are similarly each provided with one operating motor and are similarly pivotally mounted on two supporting links.

Thus in operation, when vertical take-off is desired the doors 32 are opened, the main valve 23 is closed and the valves 24 opened to divert the efflux gases into the distribution pipes 20, and fuel is injected via the injectors 26 into the pipes 20. The resultant jets of hot fuel-bearing gases from the nozzles 21 are burnt in the ducts 13 and streams of air are induced thereby into the mouths 14 of the ducts, heated and accelerated in the ducts themselves, and ejected downwardly with considerable velocity together with the combustion gases, the resultant reaction thrust being applied upwardly to the aircraft to cause it to rise vertically whilst remaining in a generally horizontal attitude.

During the operation of the vertical thrust generators, the fuel injected into the distribution pipes 20 will be burnt in the ducts 13 at substantially atmospheric pressure, so that the specific consumption will be high. To offset this however, the duration of such burning will be very short.

When the aircraft has reached a sufficient height, the valves 24 are gradually closed and the valves 23 are simultaneously opened, thereby gradually transferring the jet of gases from the engines 11 from the distribution pipes 20 to the main jet pipes 22, to apply a forward thrust to the aircraft to accelerate it into forward horizontal flight in which the wings will gradually take over the lift from the diminishing jets of the thrust generators 12.

Instead of being mounted in the aircraft wings as in the illustrated embodiment, the thrust generator or generators might be mounted in the aircraft fuselage beneath or in a symmetrical disposition about the centre of gravity, with its discharge nozzle projecting downwardly when the aircraft is in its normal horizontal position. Again, the aircraft might be mounted on a carriage with its fore-and-aft axis vertical, with the thrust generator or generators mounted in the rear of the fuselage in the manner of or forming a part of the conventional jet engine or engines.

Alternatively, each thrust generator might be of a total transverse width less than the thickness of the wing section, and might be pivotally mounted as a whole within the wing section so that, when the vertical thrust is no longer needed, it can be rotated about an axis parallel to the wing span and retracted into a position in which it is wholly enclosed in a housing formed in the wing.

What I claim as my invention and desire to secure by Letters Patent is:

1. An aircraft having in combination a sustaining wing affording aerodynamic lift during forward flight, the wing being formed with elongated intake and discharge apertures respectively formed in its upper and lower surfaces and extending spanwise thereof, a horizontal thrust generator providing thrust in a generally horizontal direction to propel the aircraft in forward flight, and a vertical thrust generator mounted in a housing in the wing and comprising an elongated duct extending spanwise of the wing, the duct being of converging section and extending transversely through the thickness of the wing from the intake aperture to the discharge aperture, an elongated fluid delivery conduit extending within the duct longitudinally thereof and communicating with a source of high-velocity gaseous fluid, nozzle means in the lower wall of the delivery conduit communicating with its interior to deliver an elongated jet of the high-velocity fluid downwardly through the discharge aperture of the wing, a pair of spaced elongated nozzle flaps of blade-like form movably mounted in the duct with their longitudinal axes parallel to the longitudinal axis of the duct, and flap actuating mechanism connected mechanically to the two flaps to move them generally vertically between a withdrawn position in which they are both housed within the wing in the air duct on either side of the conduit and an operative position in which they project downwardly below the lower surface of the wings from the discharge aperture, the two flaps when in their said operative position being spaced apart to define between them an elongated discharge nozzle constituting an extension to the air duct, and means for injecting fuel into the said delivery conduit and for burning the fuel to increase the thrust of the vertical thrust generator.

2. An aircraft as claimed in claim 1 in which the horizontal thrust generator comprises a jet-propulsion engine having a jet pipe, and which includes a branch pipe connected between the jet pipe of the jet-propulsion engine and the fluid delivery conduit of the vertical thrust generator, diverter valve means in the branch pipe to divert efflux gases from the jet pipe to the said delivery conduit, and fuel injection and ignition means for injecting additional fuel into the branch pipe and burning it therein.

3. An aircraft as claimed in claim 1 in which the wing is provided with at least one door flap hinged to the upper surface of the wing about an axis parallel to the axis of the fore-and-aft flight of the aircraft and movable between a closed position in which it covers and closes at least a part of the intake aperture and an open position in which it exposes at least a part of the air intake.

References Cited in the file of this patent

UNITED STATES PATENTS

| | | |
|---|---|---|
| 2,464,663 | Zingg | Mar. 15, 1949 |
| 2,501,078 | Newcomb | Mar. 21, 1950 |
| 2,589,732 | Riviere | Mar. 18, 1952 |